(12) United States Patent
Sung

(10) Patent No.: US 9,942,709 B2
(45) Date of Patent: Apr. 10, 2018

(54) DEVICE FOR ESTIMATING LOCATION AND METHOD FOR ESTIMATING LOCATION BY USING DOWNLINK ACCESS POINT

(71) Applicant: WIFIVE.CO.,LTD, Daejeon (KR)

(72) Inventor: Tae-Kyung Sung, Daejeon (KR)

(73) Assignee: WIFIVE.CO., LTD, Daejeon (KR)

( * ) Notice: Subject to any disclaimer, the term of this patent is extended or adjusted under 35 U.S.C. 154(b) by 177 days.

(21) Appl. No.: 14/436,923

(22) PCT Filed: Oct. 18, 2013

(86) PCT No.: PCT/KR2013/009326
§ 371 (c)(1),
(2) Date: Apr. 20, 2015

(87) PCT Pub. No.: WO2014/065540
PCT Pub. Date: May 1, 2014

(65) Prior Publication Data
US 2015/0271641 A1    Sep. 24, 2015

(30) Foreign Application Priority Data
Oct. 22, 2012 (KR) .......................... 10-2012-0117087

(51) Int. Cl.
*H04W 4/02* (2018.01)
*G01S 5/02* (2010.01)
(Continued)

(52) U.S. Cl.
CPC ............... *H04W 4/023* (2013.01); *G01S 1/68* (2013.01); *G01S 5/02* (2013.01); *H04W 64/00* (2013.01); *H04W 4/027* (2013.01); *H04W 4/04* (2013.01)

(58) Field of Classification Search
CPC ....... H04W 12/08; H04W 64/00; G01S 11/06; G01S 13/75
(Continued)

(56) References Cited

U.S. PATENT DOCUMENTS

2003/0108003 A1* 6/2003 Dietz ...................... H04L 12/12
370/311
2008/0070593 A1* 3/2008 Altman ................. H04L 63/102
455/457

(Continued)

FOREIGN PATENT DOCUMENTS

KR          100775858        11/2007
KR        1020110131781      12/2011
(Continued)

OTHER PUBLICATIONS

International Search Report—PCT/KR2013/009326 dated Jan. 21, 2014.
(Continued)

*Primary Examiner* — Sam Bhattacharya
(74) *Attorney, Agent, or Firm* — STIP Law Group, LLC

(57) ABSTRACT

Provided are a device and a method for estimating a position using a downlink access point enabling efficient indoor position measurement at a relatively low cost. The device for estimating a position using a downlink access point includes: a plurality of downlink access points 100 installed at specific positions; and one or more user terminal 200 displaying its current position, wherein the plurality of downlink access points 100 wirelessly transmit different address codes, and the user terminal 200 estimates a position corresponding to the received address code to be its current position in the case in which it is within a wireless transmission range of the downlink access point 100.

12 Claims, 14 Drawing Sheets

(51) Int. Cl.
*H04W 64/00* (2009.01)
*G01S 1/68* (2006.01)
*H04W 4/04* (2009.01)

(58) Field of Classification Search
USPC ........ 455/447, 456.1, 456.2, 456.6; 342/359, 342/361
See application file for complete search history.

(56) References Cited

U.S. PATENT DOCUMENTS

| | | | |
|---|---|---|---|
| 2009/0312037 A1* | 12/2009 | Jo | G01S 5/08 455/456.2 |
| 2011/0156952 A1* | 6/2011 | Bhattacharya | G01S 19/48 342/357.31 |
| 2011/0291884 A1 | 12/2011 | Oh et al. | |
| 2013/0028246 A1 | 1/2013 | Gonikberg | |
| 2013/0044028 A1* | 2/2013 | Lea | H01Q 21/24 342/359 |
| 2013/0237248 A1 | 9/2013 | Park et al. | |

FOREIGN PATENT DOCUMENTS

| | | |
|---|---|---|
| KR | 1020120056687 | 6/2012 |
| KR | 1020130014443 | 2/2013 |

OTHER PUBLICATIONS

Jeong-Min Lim et al., Integration of Pedestrian DR and Beacon-AP based Location System for Indoor Navigation, International Global Navigation Satellite Systems Society IGNSS Symposium 2013, Jul. 16-18, 2013, Queensland, Australia.

* cited by examiner

DEVICE FOR ESTIMATING LOCATION AND METHOD FOR ESTIMATING LOCATION BY USING DOWNLINK ACCESS POINT

TECHNICAL FIELD

The present invention relates to a device and a method for estimating a position using a downlink access point, and more particularly, to a device and a method for estimating a position using a downlink access point capable of estimating a user terminal's current position using address codes of downlinks access points wirelessly transmitted from the downlink access points and displaying the estimated current position.

BACKGROUND ART

Since a wireless based position system uses the wireless local area network (WLAN), the wireless fidelity (Wi-Fi), the wireless broadband Internet (Wibro), the world interoperability for microwave access (WiMax), the high speed downlink packet access (HSDPA), the Zigbee, the Bluetooth, the ultra-wideband (UWB), the infrared data association (IrDA), the ultra wide band, the shared wireless access protocol (SWAP), the long term evolution (LTE), and the like, that are being universally used, it is significantly effective in view of a cost.

A wireless network, which is one of the communication infrastructures, may implement a position system through a laptop computer, a personal digital assistant (PDA), a smart phone, or other wireless mobile devices, and this software based position solution is significant cheaper than an indoor dedicated positioning structure.

According to the related art, wireless based positioning technologies have generally used a method for determining a position by monitoring a propagation delay between wireless nodes (access point and user) in order to relatively triangulate and calculate the position. Currently, there are no standards for wireless position solutions. In addition, the respective solutions are specialized to vendors, such that they use independent patent technologies, and do not disclose details associated with determination of a position of a user.

A technology relating to general indoor position estimation according to the related art may be classified into a radio frequency (RF) fingerprint scheme of dividing a service target area into lattices, collecting base station characteristic data in the respective lattices to build-up a database, judging a matched degree between RF propagation characteristic information measured by a terminal requesting the positioning and the built-up database, and selecting a lattice having the highest matched degree as a positioning result, a received signal strength indicator (RSSI) positioning scheme, which is a scheme of calculating a position by a difference in a signal strength between base stations, and the like.

Korean Patent No. 10-0775858 (Application No. 10-2006-109443 filed on Nov. 7, 2006) has disclosed a system and a method for environment analysis for an indoor wireless location.

However, the above methods do not efficiently perform the position measurement as compared with a cost.

DISCLOSURE

Technical Problem

An object of the present invention is to enable efficient indoor position measurement at a relatively low cost.

Technical Solution

In one general aspect, a device for estimating a position using a downlink access point includes: a plurality of downlink access points 100 installed at specific positions; and one or more user terminal 200 displaying its current position, wherein the plurality of downlink access points 100 wirelessly transmit different address codes, and the user terminal 200 estimates a position corresponding to the received address code to be its current position in the case in which it is within a wireless transmission range of the downlink access point 100.

The user terminal 200 may estimate its current position using an inertial sensing unit or a geomagnetic sensor in the case in which it deviates from the wireless transmission range of the downlink access point 100.

A WiFi scheme or a Bluetooth scheme may be used in wirelessly transmitting the address codes.

One or more of the plurality of downlink access points 100 may not have a wired connection for data communication.

One or more of the plurality of downlink access points 100 may include two or more directional antennas.

One or more of the plurality of downlink access points 100 may be installed at a point having two or more entrance and exit paths, and include two or more antennas transmitting address code signals in directions directed toward areas corresponding to the respective entrance and exit paths, and the respective antennas may transmit different address codes.

Signals transmitted from the two or more antennas may be transmitted in a time division scheme.

Signals transmitted from the two or more antennas may be transmitted in a frequency division scheme.

In another aspect, a downlink access point includes: two or more directional antennas installed in different directions in one body part, wherein the respective antennas transmit different address codes.

The downlink access point may be is installed at a point having two or more entrance and exit paths, and the respective antennas may transmit corresponding address code signals in directions directed toward areas corresponding to the respective entrance and exit paths.

Signals transmitted from the two or more antennas may be transmitted in a time division scheme.

Signals transmitted from the two or more antennas may be transmitted in a frequency division scheme.

In still another aspect, a method for estimating a position using a device for estimating a position including a downlink access point 100 including an antenna and one or more user terminal 200 displaying its current position includes: a position estimating step of estimating a position corresponding to an address code received by the user terminal 200 to be a user terminal's current position in the case in which a strength of a signal received by the user terminal 200 is a predetermined reference value or more; and an inertial navigation position estimating step of estimating a user terminal's current position by reflecting the position estimated in the position estimating step and a measurement result of an inertial sensing unit in the case in which the strength of the signal received by the user terminal 200 is less than the predetermined reference value.

In the case in which an area in which data are simultaneously received from two or more antennas installed in one access point is present, in the position estimating step, it may be estimated whether a simultaneous data receivable area or a single data receivable area is present using whether or not the data are received from the two or more antennas, and a position of the user terminal may be more accurately estimated using magnitudes of received data reception signals.

In the case in which data are simultaneously received from two or more antennas installed in one access point in the position estimating step, a moving direction may be estimated using a change in data reception signals received from the two or more antennas.

In yet still another aspect, a program (smart phone application) allows a smart phone to execute the method for estimating a position as described above when it is installed in the smart phone.

In yet still another aspect, a device for estimating a position includes: at least one downlink access point 100 wirelessly providing position information including at least one access point information selected among installation coordinate information, characteristic information, and sector information; and a user terminal 200 wirelessly receiving the position information of the downlink access point 100 and estimating its current position, estimating its current position using inertial navigation in the case in which it deviates from a wireless transmission range of the downlink access point 100, and correcting its current position using the position information of the downlink access point 100 in the case in which it enters the wireless transmission range of the downlink access point 100.

The downlink access point 100 may include: a position information generating unit 110 generating at least one position information selected among coordinate information including X and Y coordinates of a point at which the downlink access point 100 is installed and further including at least one selected among a Z coordinate, layer information, and an access point ID value, at least one or more characteristic information indicating a geographical characteristic of the point at which the downlink access point 100 is installed and selected among an entrance and exit, a passage, an N-direction junction (N indicates a natural number of 2 or more), a lobby, stairs, and an elevator lobby, and at least one or more sector information selected among azimuth information of an electric wave projection direction, an electric wave radiation angle, and an electric wave radiation strength of the downlink access point at the point at which the downlink access point 100 is installed; at least one transmitter 120 connected to the position information generating unit, receiving the generated position information from the position information generating unit, and outputting transmission data through at least one communication network selected among a wireless communication network, a third generation (3G) network, a long term evolution (LTE) network, a wireless broadband Internet (WiBro) network; at least one antenna 130 connected to the transmitter 120 and wirelessly radiating the transmission data output from the transmitter 120; and a transmission controlling unit 140 connected to the position information generating unit 110, the transmitter 120, and the antenna 130, respectively, and controlling the position information generating unit 110, the transmitter 120, and the antenna 130, and in the case in which the transmitter 120 of the downlink access point 100 is configured of a single transmitter, a moving trajectory of the user terminal 200 may be estimated through a signal profile of the transmission data over time using n transmission data signals (n indicates a natural number) continuously received in a communication area of the transmitter 120 as inputs and in the case in which the transmitter 120 of the downlink access point 100 is configured of at least two transmitters, the moving trajectory of the user terminal 200 may be estimated through comparison between signal profiles of the transmission data over time using n transmission data signals (n indicates a natural number) continuously received in communication areas of the transmitters 120 as inputs.

The transmitter 120 may be configured of at least two or more transmitters using different bands.

The downlink access point 100 may further include a position information database storing the position information.

The user terminal 200 may include: a receiving unit 210 receiving the transmission data generated by the downlink access point 100; a signal quality measuring unit connected to the receiving unit 210 and measuring reception quality of the transmission data; an inertial sensing unit 230 including an inertial sensor configured of at least one or more selected from a geomagnetic sensor, an accelerometer, and a gyroscope; and a reception controlling unit 240 connected to the receiving unit 210, the signal quality measuring unit 220, and the inertial sensing unit 230, respectively, controlling the receiving unit 210, the signal quality measuring unit 220, and the inertial sensing unit 23, and estimating a position of the user terminal 200.

The receiving controlling unit 240 may include: a position estimating unit 241 estimating the position using the transmission data received by the receiving unit 210 in the case in which a strength of the signal measured by the signal quality measuring unit 220 is a predetermined reference value or more; an inertial navigation position estimating unit 242 estimating the position by the inertial navigation using the position estimated by the position estimating unit 241 and inertial data sensed by the inertial sensing unit 230 in the case in which the strength of the signal measured by the signal quality measuring unit 220 is less than the predetermined reference value; and a correcting unit 243 correcting the position estimated by the position estimating unit 241 or the inertial navigation position estimating unit 242 using the transmission data received by the receiving unit 210 in the case in which the strength of the signal measured by the signal quality measuring unit 220 is the predetermined reference value or more.

The correcting unit 243 may include: a position correcting unit 244 correcting the position using the transmission data received by the receiving unit 210; and a trajectory correcting unit 245 correcting a moving trajectory using the transmission data received by the receiving unit 210.

In yet still another aspect, a method for estimating a position using a device for estimating a position include: a the data receiving step S10 of receiving transmission data wirelessly provided from a downlink access point 100, by a user terminal 200; a first signal quality measuring step S20 of measuring signal quality of the transmission data received in the data receiving step S10, by the user terminal 200; a first position estimating step S30 of receiving coordinate information of the transmission data received in the data receiving step S10 and estimating the position, by the user terminal 200, in the case in which a strength of the signal measured in the first signal quality measuring step S20 is a predetermined reference value or more; a second signal quality measuring step S40 of measuring signal quality of the downlink access point 100 transmitting the transmission data in the case in which the user terminal 200 estimates the position using the transmission data; an inertial navigation position estimating step S50 of receiving the position estimated in the position estimating step S30 and inertial sensed data of the user terminal 200 and estimating the position using the inertial navigation, by the user terminal 200, in the case in which the strength of the signal measured in the second signal quality measuring step S40 is less than a predetermined reference value; a third signal quality measuring step S60 of receiving the transmission data of the downlink access point 100 or another downlink access point 100 and measuring signal quality, by the user terminal 200; a second position correcting step S70 of receiving the position estimated in the first position estimating step S30 or the inertial navigation position estimating step S50, receiving the transmission data in the third signal quality measuring step S60, and correcting the position to estimate the position, by the user terminal 200, in the case in which the strength of the signal measured in the third signal quality measuring step S60 is a predetermined reference value or more; a program ending step S80 of ending a program of estimating the position of the user terminal 200.

The transmission data wirelessly provided from the downlink access point 100 may include at least one position information selected among coordinate information including X and Y coordinates of a point at which the downlink access point 100 is installed and further including at least one selected among a Z coordinate, layer information, and an access point ID value, at least one or more characteristic information indicating a geographical characteristic of the point at which the downlink access point 100 is installed and selected among an entrance and exit, a passage, an N-direction junction (N indicates a natural number of 2 or more), a lobby, stairs, and an elevator lobby, and at least one or more sector information selected among azimuth information of an electric wave projection direction, an electric wave radiation angle, and an electric wave radiation strength of the downlink access point 100 at the point at which the downlink access point 100 is installed.

The correcting step S70 may include a position correcting step of receiving the coordinate information of the transmission data received in the third signal quality measuring step S60 and correcting the position, by the user terminal 200; and a trajectory correcting step of receiving the characteristic information and the sector information of the transmission data received in the third signal quality measuring step S60 and correcting a moving trajectory, by the user terminal 200.

Advantageous Effects

It is possible to efficiently measure an indoor position at a relatively low cost.

DETAILED DESCRIPTION OF MAIN ELEMENTS

Figure 1:
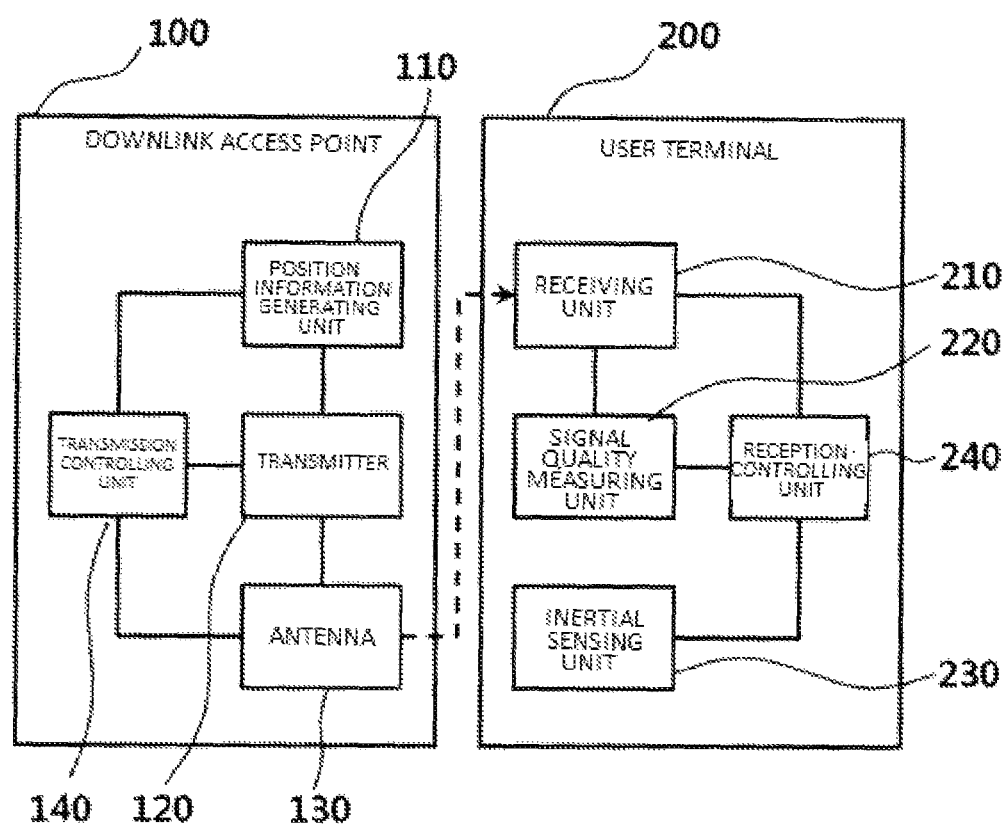
FIG. 1 is a block diagram of a device for estimating a position according to an exemplary embodiment of the present invention.

100: Downlink access point
110: Position information generating unit
120: Transmitter
130: Antenna
140: Transmission controlling unit
200: User terminal
210: Receiving unit
220: Signal quality measuring unit
230: Inertial sensing unit
240: Reception controlling unit
241: Position estimating unit
242: Inertial navigation position estimating unit
243: Correcting unit
244: Position correcting unit
245: Trajectory correcting unit
S10: Data receiving step
S20: First signal quality measuring step
S30: First position estimating step
S40: Second signal quality measuring step
S50: Inertial navigation position estimating step
S60: Third signal quality measuring step
S70: Second position estimating step
S80: Program ending step

BEST MODE

Hereinafter, a device and a method for estimating a position according to an exemplary embodiment of the present invention will be described in detail with reference to the accompanying drawings.

Figure 2:
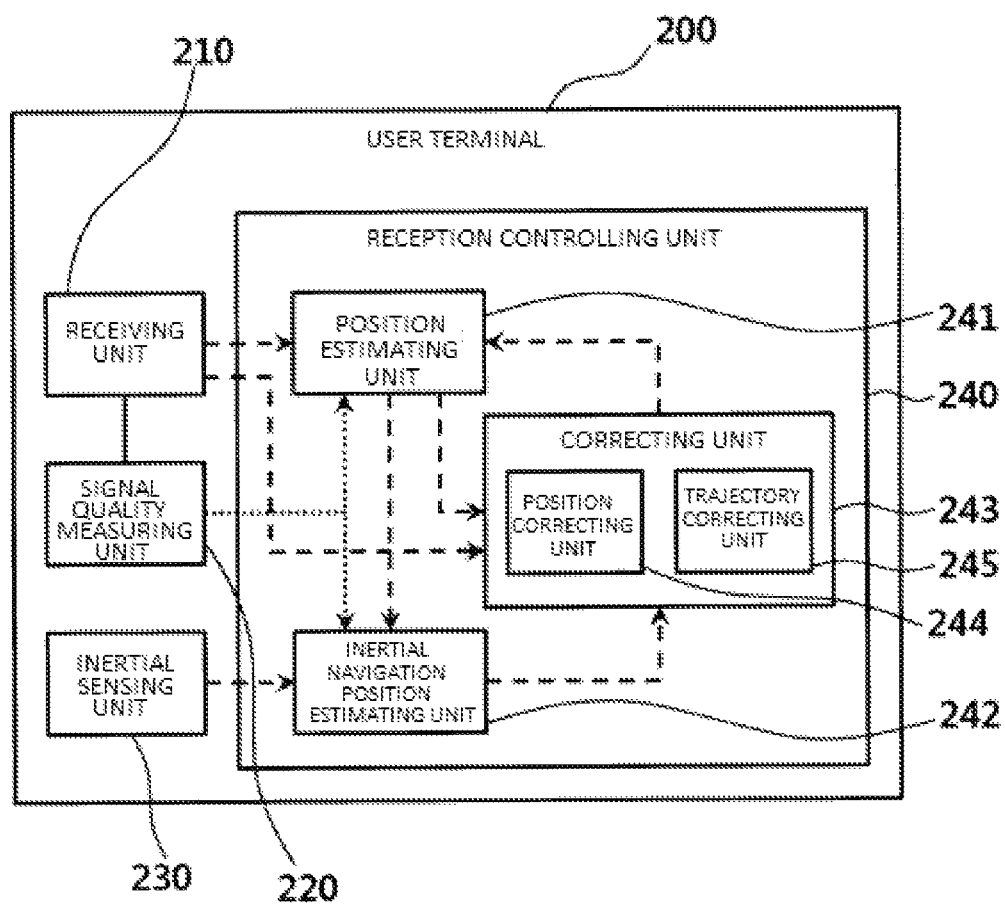
FIG. 2 is a block diagram of a user terminal of the device for estimating a position according to an exemplary embodiment of the present invention.
Figure 3:
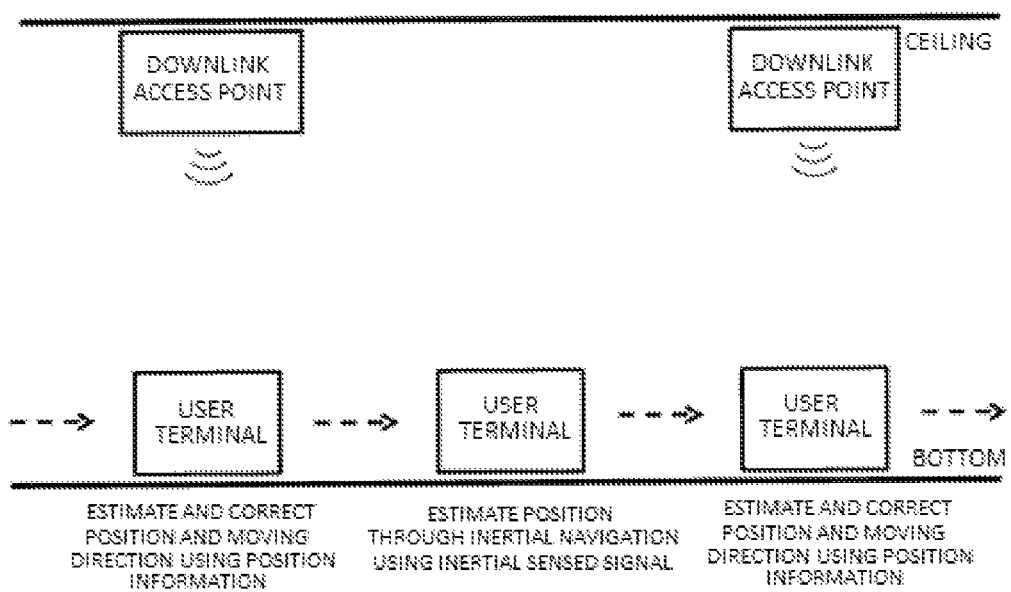
FIG. 3 is an illustrative diagram of the device for estimating a position according to an exemplary embodiment of the present invention.
Figure 4:
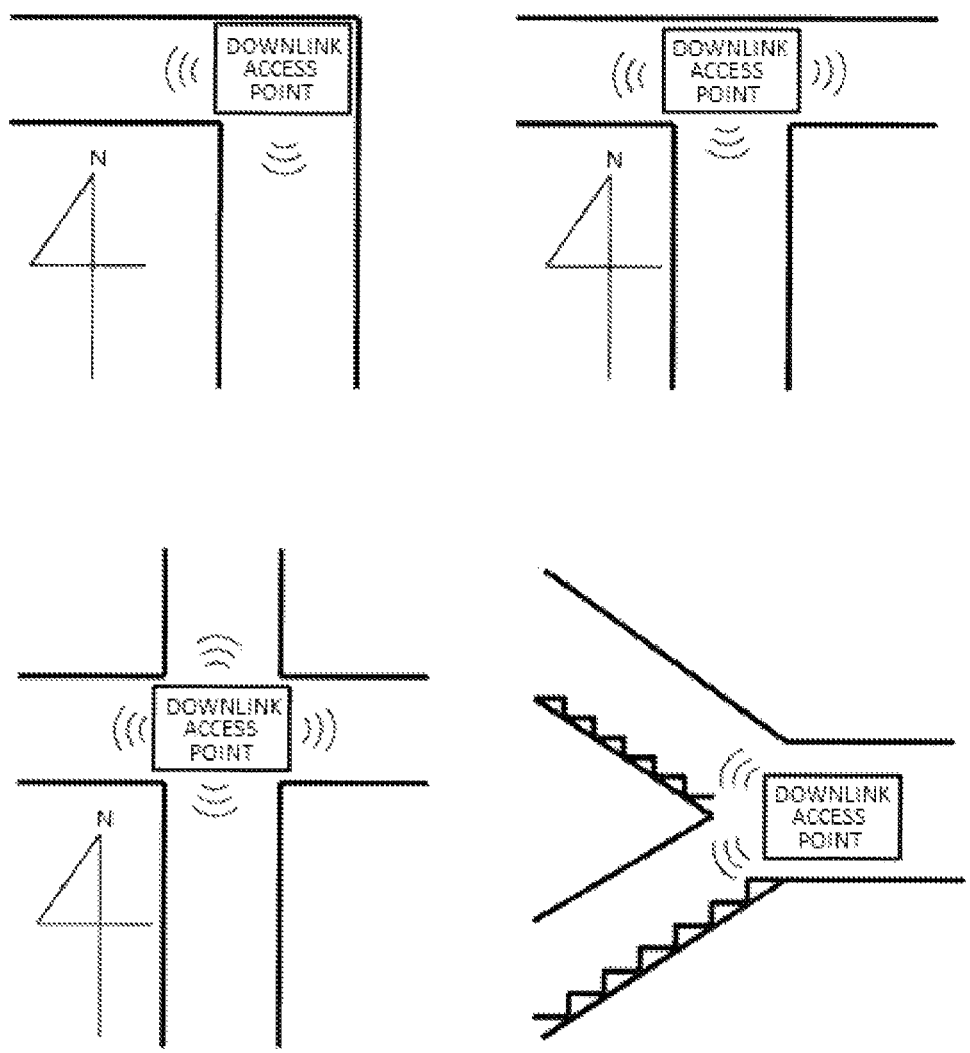
FIG. 4 is an illustrative diagram of disposition of the device for estimating a position according to an exemplary embodiment of the present invention.
Figure 5:
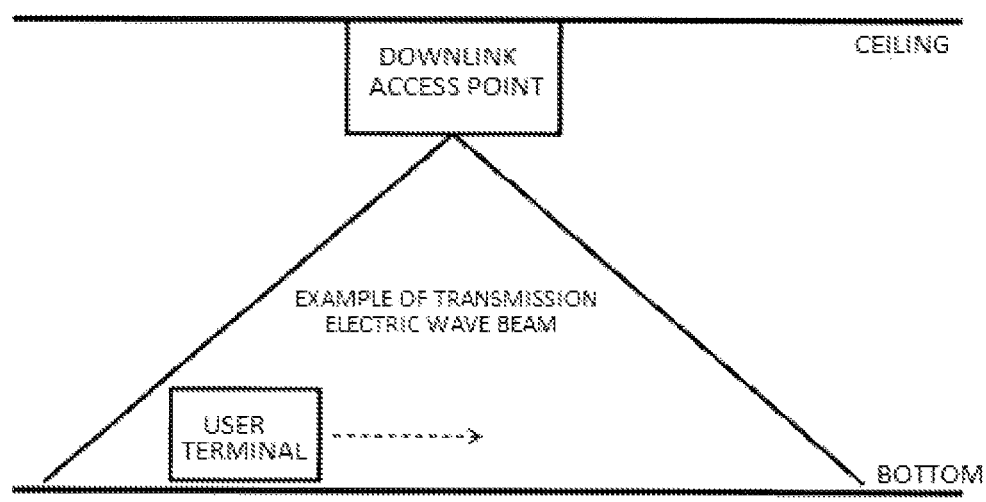
FIG. 5 is an illustrative diagram of a method for estimating a position according to an exemplary embodiment of the present invention.
Figure 5:
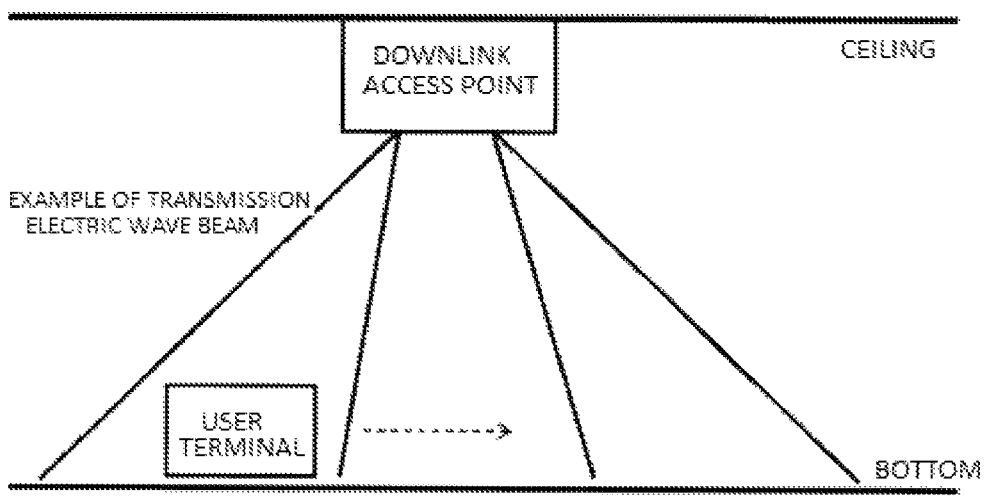
Figure 6:
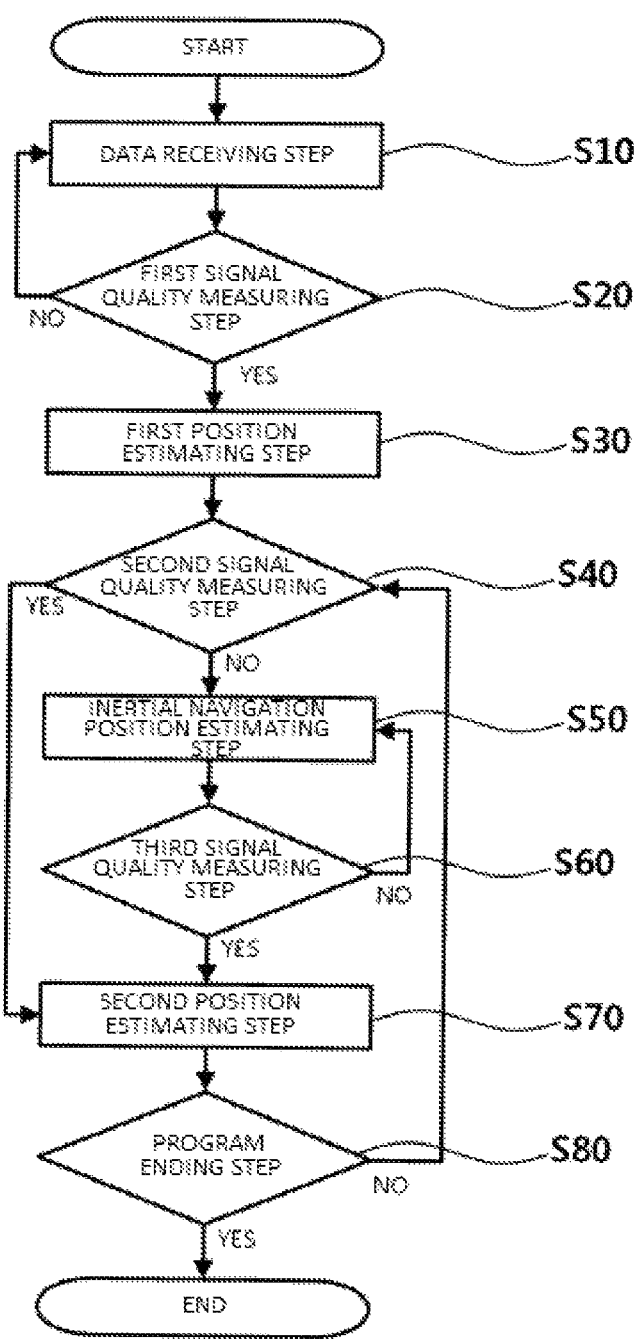
FIG. 6 is a flow chart of the method for estimating a position according to an exemplary embodiment of the present invention.
Figure 7:
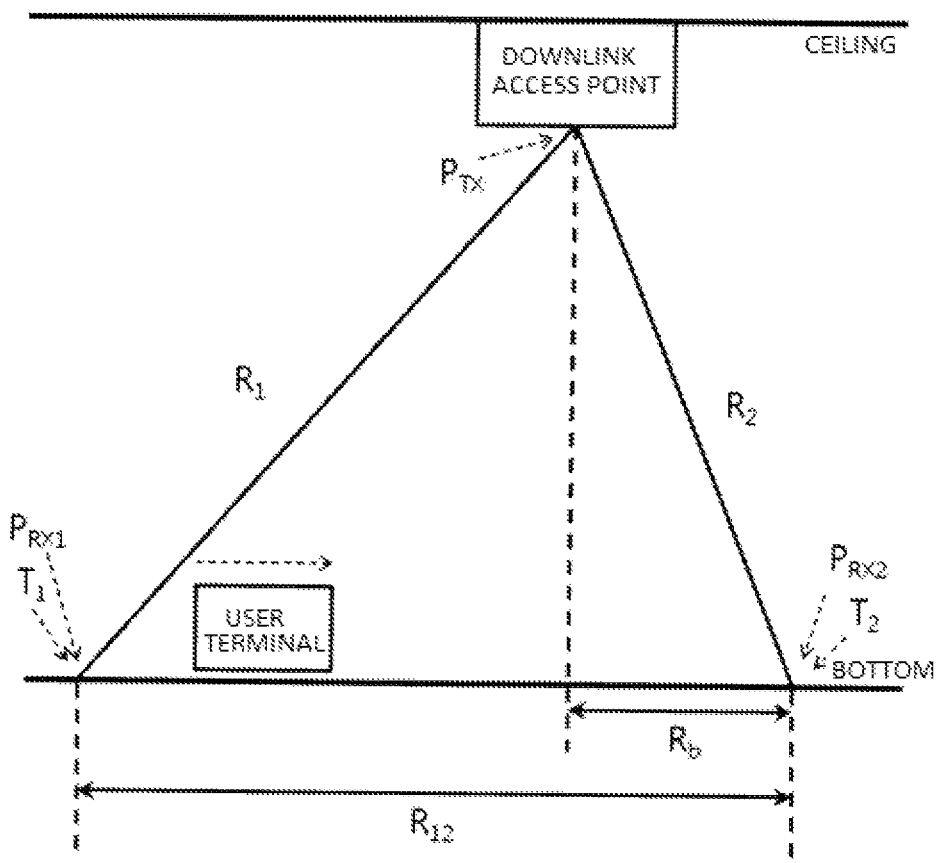
FIG. 7 is a diagram showing a reference point estimating algorithm according to an exemplary embodiment of the present invention.
Figure 8A:
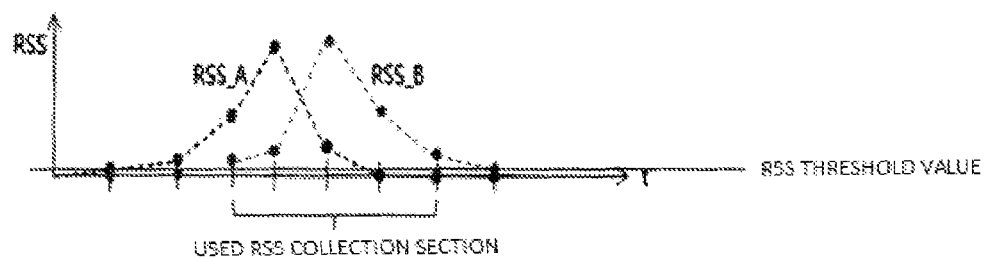
FIGS. 8A to 8C are graphs showing a data used for estimating a moving trajectory according to an exemplary embodiment of the present invention.
Figure 8B:
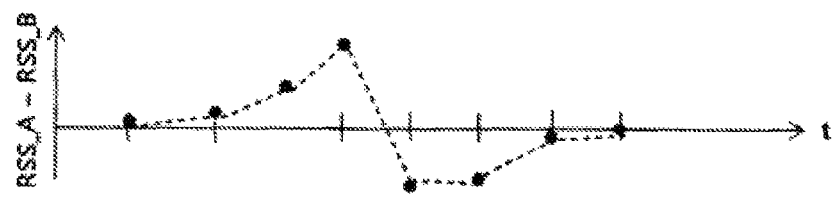
Figure 8C:
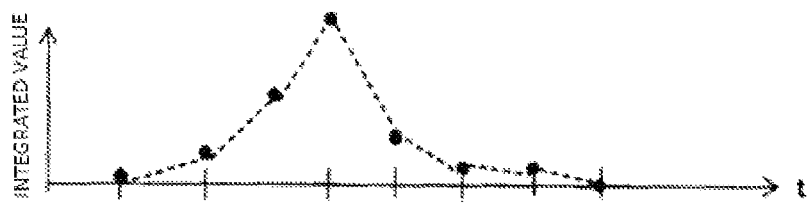

FIG. 1 is a block diagram of a device for estimating a position according to an exemplary embodiment of the present invention; FIG. 2 is a block diagram of a user terminal of the device for estimating a position according to an exemplary embodiment of the present invention; FIG. 3 is an illustrative diagram of the device for estimating a position according to an exemplary embodiment of the present invention; FIG. 4 is an illustrative diagram of disposition of the device for estimating a position according to an exemplary embodiment of the present invention; FIG. 5 is an illustrative diagram of a method for estimating a position according to an exemplary embodiment of the present invention; FIG. 6 is a flow chart of the method for estimating a position according to an exemplary embodiment of the present invention; FIG. 7 is a diagram showing a reference point estimating algorithm according to an exemplary embodiment of the present invention; and FIGS. 8A to 8C are graphs showing a data used for estimating a moving trajectory according to an exemplary embodiment of the present invention.

As shown in FIG. 1, the device for estimating a position according to an exemplary embodiment of the present invention is configured to include a downlink access point 100 and a user terminal 200.

The downlink access points 100 wirelessly provide position information, and the number of downlink access points 100 is at least one. The downlink access points 100 may be installed at places appropriate for positioning and selected as small as possible.

The position information wirelessly provided by the downlink access point 100, which is information enabling the user terminal 200 to estimate a current position, includes a unique code address of each downlink access point 100. When the user terminal receives the unique address code, if it recognizes an installation position of the downlink access point 100 having the unique address code, it may estimate its current position using information on the installation position. The user terminal may receive the information on an installation position of each downlink access point 100 in advance or may receive the information on the installation position of each downlink access point 100 together with the unique address code of each downlink access point 100 when it receive the unique address code.

Here, when the user terminal 200 receives a specific address code from the downlink access point 100, it may recognize that it is positioned in the vicinity (wireless signal receivable area) of the downlink access point 100 corresponding to the specific address code. In addition, when a magnitude of a received signal may be measured, a distance between the downlink access point 100 and the user terminal 200 may be estimated from the magnitude of the received signal, the position of the user terminal 200 may be more accurately estimated.

As shown in FIG. 3, the user terminal 200 wirelessly receives the position information of the downlink access point 100 and estimates its current position, estimates its current position by inertial navigation using inertial sensed data in the case in which it deviates from a wireless transmission range of the downlink access point 100, and corrects its current position using the position information of the downlink access point 100 in the case in which it enters the wireless transmission range of the downlink access point 100. In other words, in the case in which the user terminal enters a position information transmission range of the downlink access point 100, a position of the user terminal 200 is measured using the position information of the downlink access point 100, and in the case in which the user terminal deviates from the position information transmission range of the downlink access point 100, a position of the user terminal 200 is measured by the inertial navigation using a finally measured position and the inertial sensed data of the user terminal 200 as the inputs.

First, the downlink access point will be described in detail. As shown in FIG. 1, the downlink access point 100 may be configured to include a position information generating unit 110, a transmitter 120, an antenna 130, and a transmission controlling unit 140.

The position information generating unit 110 may generate the position information of the downlink access point 100. Here, the position information may include at least one access point information selected among installation coordinate information, characteristic information, and sector information.

The installation coordinate information may include X and Y coordinates of a point at which the downlink access point is installed and may further include a Z coordinate, layer information, an address code of the access point, and the like. The address code is allocated to each of the access points to allow the access points to be distinguished from each other, and an example of the address code includes a media access control (MAC) address, a basic service set identification (BSSID), and the like. In addition, an existing coordinate system such as a cylindrical coordinate system, a spherical coordinate system, or the like, and a transformation coordinate system may also be used. Here, the used coordinate information may be used as data required for measuring or correcting a position of the position information receiving unit 200.

The characteristic information indicates a geographical characteristic of the point at which the downlink access point is installed, and may include information such as an entrance and exit, a passage, an N-direction junction (N indicates a natural number of 2 or more), a lobby, stairs, an elevator lobby, and the like. For example, as shown in FIG. 4, the characteristic information may indicate the geographical characteristic of the point at which the downlink access point is installed. An access point of an entrance connected to the outside of a building may additionally provide global positioning system (GPS) absolute coordinate information to enable a continuous moving trajectory inside and outside the building to be tracked.

The sector information may include information such as azimuth information of an electric wave projection direction, an electric wave radiation angle, an electric wave radiation strength, and the like, of the downlink access point at the point at which the downlink access point is installed. That is, a sector means an area in which one antenna of the access point may transmit an electric wave and the user terminal may receive the electric wave, and the sector information means information on the sector.

The characteristic information and the sector information may be used as data required for correcting a moving trajectory of the position information receiving unit 200 and may be used as data required for correcting data on a position measured using the inertial navigation.

The transmitter 120 is connected to the position information generating unit 110, receives the generated position information from the position information generating unit, and outputs transmission data.

The transmitter 120 may output the transmission data using communication networks such as a wireless communication network, the third generation (3G) network, the long term evolution (LTE) network, the wireless broadband Internet (WiBro) network, and the like, directly outputting signals wirelessly. In addition, the transmitter 120 may be configured of at least two transmitters using different bands.

For example, in the case in which the transmitter 120 is configured of two transmitters, for example, a transmitter using a band of 2.4 GHz and a transmitter using a band of 5 GHz, channels are divided in ISM (Industrial, Scientific, and Medical) bands of 2.4 GHz and 5 GHz, and a number is allocated to each channel.

The transmission controlling unit 140 may transmit the transmission data to each of the transmitter using the band of 2.4 GHz and the transmitter using the band of 5 GHz, and the transmitter using the band of 2.4 GHz may up-convert the transmission data into a channel of the band of 2.4 GHz and the transmitter using the band of 5 GHz may up-convert the transmission data into a channel of the band of 5 GHz to set transmission channels of the respective channels.

The antenna 130 is connected to the transmitter 120 and wirelessly radiates the transmission data output from the transmitter 120. Here, the position information transmission range of the downlink access point 100 may be determined depending on an installing method of the antenna. A directional antenna may be used in order to narrow a transmission direction of the antenna.

The transmission controlling unit 140 may be connected to the position information generating unit 110, the transmitter 120, and the antenna 130, respectively, and control the position information generating unit 110, the transmitter 120, and the antenna 130.

In addition, the downlink access point 100 may further include a position information database to store the position information.

Next, the user terminal will be described in detail. As shown in FIG. 1, the user terminal 200 may be configured to include a receiving unit 210, a signal quality measuring unit 220, an inertial sensing unit 230, and a reception controlling unit 240.

The receiving unit 210 may receive the transmission data generated by the downlink access point 100.

The signal quality measuring unit 200 may be connected to the receiving unit 210 and measure reception quality of the transmission data. Here, the signal quality measuring unit 200 provides information on the reception quality to the reception controlling unit.

The inertial sensing unit 230 includes an inertial sensor. The inertial sensor indicates a sensor capable of measuring linear acceleration, rotation acceleration, and the like, of an object using inertial force, and an example of the inertial sensor includes an acceleration sensor, and a gyro sensor, and the like.

The reception controlling unit 240 may be connected to the receiving unit 210, the signal quality measuring unit 220, and the inertial sensing unit 230, respectively, control the receiving unit 210, the signal quality measuring unit 220, and the inertial sensing unit 23, and estimate a position of the user terminal 200.

The reception controlling unit 240 will be described in more detail. The reception controlling unit 240 may include a position estimating unit 241, an inertial navigation position estimating unit 242, and a correcting unit 243.

The position estimating unit 241 may estimate the position using the transmission data received by the receiving unit 210 in the case in which a strength of the signal measured by the signal quality measuring unit 220 is a predetermined reference value or more. In other words, when the signal quality is reliable, the position of the user terminal 200 may be measured using the position information of the downlink access point 100.

The inertial navigation position estimating unit 242 may estimate the position by the inertial navigation using the position estimated by the position estimating unit 241 and inertial data sensed by the inertial sensing unit 230 in the case in which the strength of the signal measured by the signal quality measuring unit 220 is less than the predetermined reference value. In other words, when the signal quality is not reliable, the position of the user terminal 200 may be measured by the inertial navigation using the finally measured position and the inertial sensed data of the user terminal 200 as the inputs.

The correcting unit 243 may correct the position estimated by the position estimating unit 241 or the inertial navigation position estimating unit 242 using the transmission data received by the receiving unit 210 in the case in which the strength of the signal measured by the signal quality measuring unit 220 is the predetermined reference value or more. Here, the correcting unit 243 may include a position correcting unit 244 correcting the position using the transmission data received by the receiving unit 210 and a trajectory correcting unit 245 correcting a moving trajectory using the transmission data received by the receiving unit 210. In other words, when the user terminal enters an area in which the signal quality of the position information transmitted by the downlink access point 100 is reliable during a period in which the position of the user terminal 200 is measured using the inertial navigation, the position of the user terminal 200 may be corrected using the position information of the downlink access point 100.

Since a smart phone includes a device capable of receiving a wireless signal from the access point, an inertial sensor such as an acceleration sensor, a gyro sensor, or the like, and other control devices, it may be used as the user terminal 200. That is, when an application program allowing various internal devices of the smart phone to function as the receiving unit 210, the signal quality measuring unit 220, the inertial sensing unit 230, and the reception controlling unit 240 is installed, the smart phone may become the user terminal 200 according to the present invention.

Since an existing smart phone generally includes a geomagnetic sensor in addition the inertial sensor, the user terminal 200 may more accurately estimate a posture and a position using the geomagnetic sensor in addition to the inertial sensing unit. That is, in the case in which the user terminal 200 derivates from the wireless transmission range of the downlink access point 100, the current position of the user terminal 200 may be estimated by gathering position information estimated before the user terminal 200 deviates from the wireless transmission range of the downlink access point 100 and information estimated using the inertial sensing unit or the geomagnetic sensor. Since a technology of estimating the current position using a DR sensor such as the inertial sensing unit, the geomagnetic sensor, or the like, when the position information is not received from the device for estimating a position (for example, a GPS device) has been well-known, a detailed description thereof will be omitted. The user terminal 200 may increase accuracy in estimating the current position by using the information measured by the inertial sensing unit or the geomagnetic sensor even when it is within the wireless transmission range of the downlink access point 100.

In addition, since the existing smart phone has the WiFi communication function and the Bluetooth communication function, in the case in which a wireless communication scheme according to the present invention is the WiFi scheme or the Bluetooth communication scheme, the existing smart phone may be used as the user terminal 200 according to the present invention. The downlink access point in the WiFi scheme or the downlink access point in the Bluetooth scheme may be easily installed in a building using the related art.

Here, the downlink access point may be implemented so that it is connected to an external communication network (for example, Internet network) to enable the user terminal 200 to perform data communication with the external communication network in the WiFi scheme or the Bluetooth scheme or may be implemented only so as to generate a downlink signal to the user terminal 200 without being connected to the external communication network.

The reason why the access point 100 according to the present invention is called the downlink access point is that the access point 100 necessarily includes a component transmitting a signal from the access point 100 toward the user terminal 200, that is, a downlink signal. An access point according to the related art is generally connected to an external device in a wired scheme in order to again transmit and receive data transmitted to and received from the user terminal to and from the external device. However, since the downlink access point 100 according to the present invention needs only to transmit the downlink signal required for detect the position of the terminal, a wired connection for performing the data communication with the external device is not required. Therefore, when the downlink access point 100 according to the present invention is installed, only a power supply line needs only to be connected to the downlink access point 100, and the wired connection for performing the data communication is not required, such that it is simple to install the downlink access point 100 according to the present invention.

Therefore, the present invention is characterized in that it includes a plurality of downlink access points 100, one or more of which does not have the wired connection for performing the data communication.

As shown in FIG. 1, the downlink access point 100 includes at least one transmitter 120.

The transmitter 120 may serve to output the transmission data in a downlink direction to allow an approximate position of the user terminal 200 to be detected as an address code of the access point.

Further, in the case in which received signal strength index (RSSI) information is also used, it is possible to estimate a position distant from the access point. Here, in the case in which the transmitter 120 is configured of a single transmitter, places at which the RSSIs are the same as each other are present symmetrically to each other, ambiguity for the position may be present at the time of using the RSSI values.

In this case, when the transmitter outputs the transmission data in an oblique direction, directionality is present in a waveform of an electric wave, such that the ambiguity for the position at the time of estimating a distance using the RSSI may be decreased.

In addition, the transmission data are output without interference between adjacent access points, thereby making it possible to prevent the interference between the access points. In this case, the transmission data are output in different oblique directions, thereby making it possible to estimate a position and a moving direction of the user. That is, it is possible to estimate the moving direction using a feature that received signal strengths are different from each other depending on the direction of the user.

The user terminal 200 of the device for estimating a position according to an exemplary embodiment of the present invention may be characterized in that in the case in which the transmitter 120 of the downlink access point 100 is configured of a single transmitter, the moving trajectory of the user terminal 200 is estimated through a signal profile of the transmission data over time using n transmission data signals (n indicates a natural number) continuously received in a communication area of the transmitter 120 as inputs. For example, as shown in FIG. 7, the position may be estimated by calculating a distance between the downlink access point and the user terminal using the following Equation.

$$R_1 = f(P_{TX} - R_{RX1})$$ [Equation]
$$R_2 = f(P_{TX} - P_{RX2})$$
$$R_{12} = V_{walk}(T_2 - T_1)$$
$$s = (R_1 + R_2 + R_{12})/2$$
$$A^2 = s(s - R_1)(s - R_2)(s - R_{12})$$
if
$$R_1^2 + R_2^2 > R_{12}^2$$
and
$$R_2^2 + R_{12}^2 > R_1^2$$
and
$$R_{12}^2 + R_1^2 > R_2^2$$
$$R_b = \sqrt[2]{R_2^2 - 4A_{area}^2/R_{12}^2}$$

Here, $R_1$ indicates a distance between the downlink access point and the user terminal receiving a first signal, $R_2$ indicates a distance between the downlink access point and the user terminal receiving a second signal, $R_{12}$ indicates a distance between the user terminal receiving the first signal and the user terminal receiving the second signal, f indicates a function for calculating an output for a signal strength input as a distance, $P_{TX}$ indicates a strength of a transmission signal, $P_{RX1}$ indicates a strength of a first received signal, $P_{RX2}$ indicates a strength of a second received signal, $V_{walk}$ indicates a moving speed, $T_1$ indicates a received time of the first signal, $T_2$ indicates a received time of the second signal, s indicates a variable defined by Heron's formula, $A_{area}$ indicates a width of a triangle, and $R_b$ indicates a distance between the downlink access point and the user terminal.

In addition, the user terminal 200 of the device for estimating a position according to an exemplary embodiment of the present invention may be characterized in that in the case in which the transmitter 120 of the downlink access point 100 is configured of at least two transmitters, the moving trajectory of the user terminal 200 is estimated through comparison between signal profiles of the transmission data over time using n transmission data signals (n indicates a natural number) continuously received in communication areas of the transmitters 120 as inputs. For example, in the case in which the user approaches the access point in view of the access point for measuring the position, an RSS value is increased. RSS signals of the respective transmitters 120 are received by the user terminal 200 and are compared with each other, thereby making it possible to estimate the moving trajectory. Here, in the case in which the RSS signals are accumulated, the accumulated RSS signals appear as a graph having an increased gradient. To the contrary, in the case in which the user becomes distant from the access point, the accumulated RSS signals appear in a form in which a gradient thereof is decreased. The moving trajectory may be estimated based on this signal form. The moving trajectory may be determined by comparing differences of the RSS signals of the respective transmitters 120 with each other or accumulating the RSS signals of the respective transmitters 120 and using a waveform and a peak value of the accumulation result.

For example, in the case in which the user approaches the access point in view of the access point for measuring the position, an RSS value is increased. The moving direction may be recognized by comparing difference values of the RSS signals depending on a time with each other. Here, in the case in which the RSS signals are accumulated, the accumulated RSS signals appear as a graph having an increased gradient. To the contrary, in the case in which the user becomes distant from the access point, the accumulated RSS signals appear in a form in which a gradient thereof is decreased. The moving direction may be estimated based on this signal form.

Next, an example of a specific method in which the downlink access point 100 estimates the moving trajectory will be described. In the case in which the downlink access point 100 includes two transmitters, for example, a transmitter A and a transmitter B, received signal strengths (RSSs) of the transmitter A and the transmitter B are measured per time t1, t2, t2, . . . .

This is shown as a graph of FIG. 8A. Here, in order to perform the method for estimating the moving direction according to the present invention, RSS_A and RSS_B should have a value larger than an RSS threshold value, and the moving trajectory may be estimated during a time region (that is, a 'used RSS collection section) satisfying this condition. The moving trajectory is estimated using the collected RSS_A and RSS_B. FIG. 8B is a graph for difference values between RSS_A and RSS_B. When a profile in which a value becomes large from 0 to a positive value, becomes a negative value, and is then converged on 0 over time is sensed in the graph, it may be judged that the user terminal moves from RSS_A to RSS_B, and when a profile in which a value becomes small from 0 to a negative value, becomes a positive value, and is then converged on 0 over time is sensed in the graph, it may be judged that the user terminal moves from RSS_B to RSS_A.

FIG. 8C is a graph for an accumulated value of difference values between RSS_A and RSS_B. When a peak value is positive in the graph, the moving direction of the user terminal is a direction from RSS_A to RSS_B. When a peak value is negative in the graph, the moving direction of the user terminal is a direction from RSS_B to RSS_A.

Therefore, when a plurality of antennas directed toward areas of each entrance and exit path in the downlink access point 100 installed at a point having two or more entrance and exit paths are installed and transmits different address codes, respectively, as shown in FIG. 4, the user terminal 200 measures changes in magnitudes of signals including the respective address codes and uses electric wave transmission area information of the antennas corresponding to the respective address codes, thereby making it possible to estimate the moving direction of the user terminal 200.

As shown in FIG. 6, the method for estimating a position using the device for estimating a position according to an exemplary embodiment of the present invention includes a data receiving step S10, a first signal quality measuring step S20, a first position estimating step S30, a second signal quality measuring step S40, an inertial navigation position estimating step S50, a third signal quality measuring step S60, a second position estimating step S70, and a program ending step S80.

In the data receiving step S10, the user terminal 200 receives the transmission data wirelessly provided from the downlink access point 100.

In the first signal quality measuring step S20, the user terminal 200 measures the signal quality of the transmission data received in the data receiving step S10.

In the first position estimating step S30, the user terminal 200 receives the coordinate information of the transmission data received in the data receiving step S10 and estimates the position, in the case in which the strength of the signal measured in the first signal quality measuring step S20 is a predetermined reference value or more. That is, the user terminal 200 generates or estimates initial current position data by the first position estimating step S30.

In the second signal quality measuring step S40, the signal quality of the downlink access point 100 transmitting the transmission data is measured in the case in which the user terminal 200 estimates the position using the transmission data.

In the inertial navigation position estimating step S50, the user terminal 200 receives the position estimated in the position estimating step S30 and the inertial sensed data of the user terminal 200 and estimates the position using the inertial navigation, in the case in which the strength of the signal measured in the second signal quality measuring step S40 is less than a predetermined reference value. That is, in the case in which the user terminal deviates from the position information transmission range of the downlink access point 100, the position of the user terminal 200 is measured by the inertial navigation using the finally measured position and the inertial sensed data of the user terminal 200 as the inputs.

In the inertial navigation, which is a position measuring technology, when a measured position is input, an orientation reference is determined by a gyroscope, and a movement displacement is calculated using an accelerometer, thereby making it possible to always calculate and detect a position and a speed. The accelerometer is used in order to detect an acceleration of an object. The gyroscope, which is a toll used to measure or maintain a direction, is based on a law of conservation of angular momentum. The acceleration is detected using the accelerometer, and this process is repeated two times to calculate a moving distance of the object. In addition, this is calculated together with position information of a start point to calculate a current position of the object. The inertial navigation has an advantage that it is not affected by bad weather or jamming. However, since an error is accumulated and increased when the object moves at a long distance, it is preferable to correct the error.

In the third signal quality measuring step S60, the user terminal 200 receives the transmission data of the downlink access point 100 or another downlink access point 100 and measures the signal quality.

In the second position estimating step (correcting step) S70, the user terminal 200 may receive the position estimated in the first position estimating step S30 or the inertial navigation position estimating step S50, receive the transmission data in the third signal quality measuring step S60, and correct the position to estimate the position, in the case in which the strength of the signal measured in the third signal quality measuring step S60 is a predetermined reference value or more. That is, when the user terminal enters an area in which the signal quality of the position information transmitted by the downlink access point 100 is reliable during a period in which the position of the user terminal 200 is measured using the inertial navigation, the position of the user terminal 200 may be corrected using the position information of the downlink access point 100.

Here, the correcting step S70 may include a position correcting step of receiving the coordinate information of the transmission data received in the third signal quality measuring step S60 and correcting the position, by the user terminal 200, and a trajectory correcting step of receiving the characteristic information and the sector information of the transmission data received in the third signal quality measuring step S60 and correcting the moving trajectory, by the user terminal 200.

In the second position estimating step s70, the user terminal 200 estimates the position by applying the inertial navigation technology using the data corrected in the correcting step S70 and the inertial sensed data of the user terminal 200 as the inputs.

The transmission data wirelessly provided from the downlink access point 100 may include installation coordinate information, characteristic information, sector information, and the like, of the downlink access point 100.

The installation coordinate information may include X and Y coordinates of a point at which the downlink access point 100 is installed and may further include a Z coordinate, layer information, an address code of the access point, and the like. In addition, an existing coordinate system such as a cylindrical coordinate system, a spherical coordinate system, or the like, and a transformation coordinate system may also be used. Here, the used coordinate information may be used as data required for measuring or correcting a position of the position information receiving unit 200.

The characteristic information indicates a geographical characteristic of the point at which the downlink access point 100 is installed, and may include information such as an entrance and exit, a passage, an N-direction junction (N indicates a natural number of 2 or more), a lobby, stairs, an elevator lobby, and the like. The sector information may include information such as azimuth information of an electric wave projection direction, an electric wave radiation angle, an electric wave radiation strength, and the like, of a downlink access point at the point at which the downlink access point 100 is installed.

The characteristic information and the sector information may be used as data required for correcting a moving trajectory of the position information receiving unit 200 and may be used as data required for correcting data on a position measured using the inertial navigation.

In the program ending step S80, a program of estimating the position of the user terminal 200 ends, and a process returns to the second signal quality measuring step S40 when the program does not end in the program ending step, thereby continuously performing the position estimation.

The method for estimating a position may be used as a method for installing an application (program) allowing the smart phone to use the method for estimating a position in the smart phone. The application (program) may be stored in a computer readable recording medium.

Figure 9:
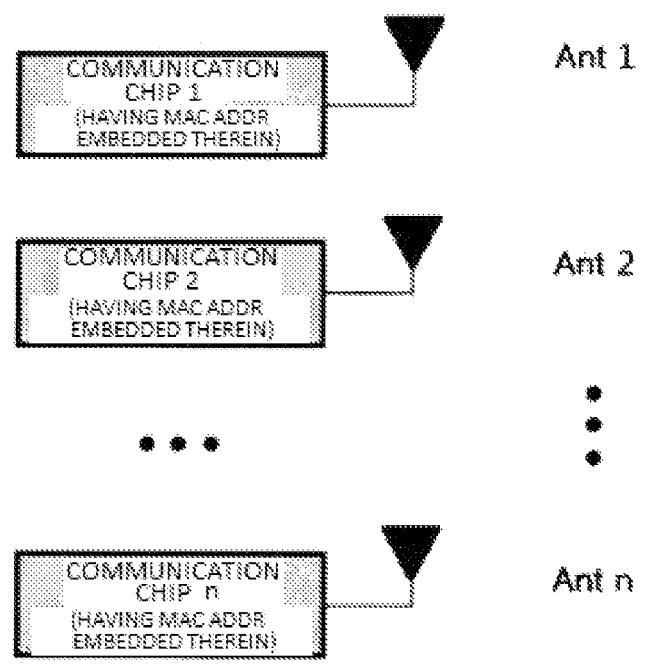
FIG. 9 is a conceptual diagram of a single antenna access point.
Figure 10A:
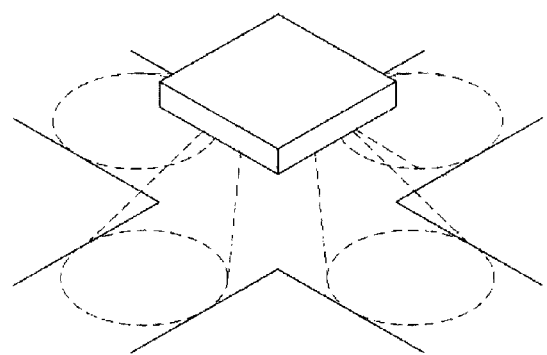
FIGS. 10A and 10B are diagrams showing a form in which a plurality of antennas are installed in on body part.
Figure 10B:
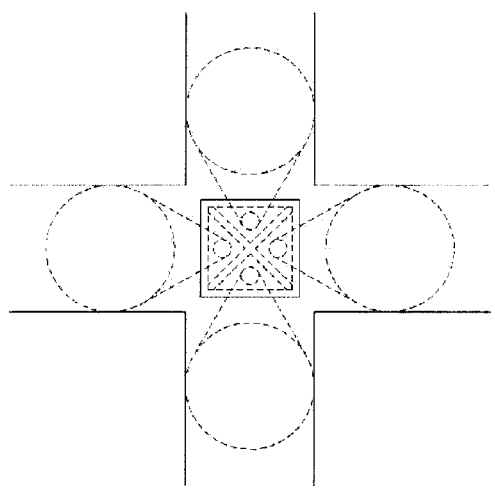
Figure 11:
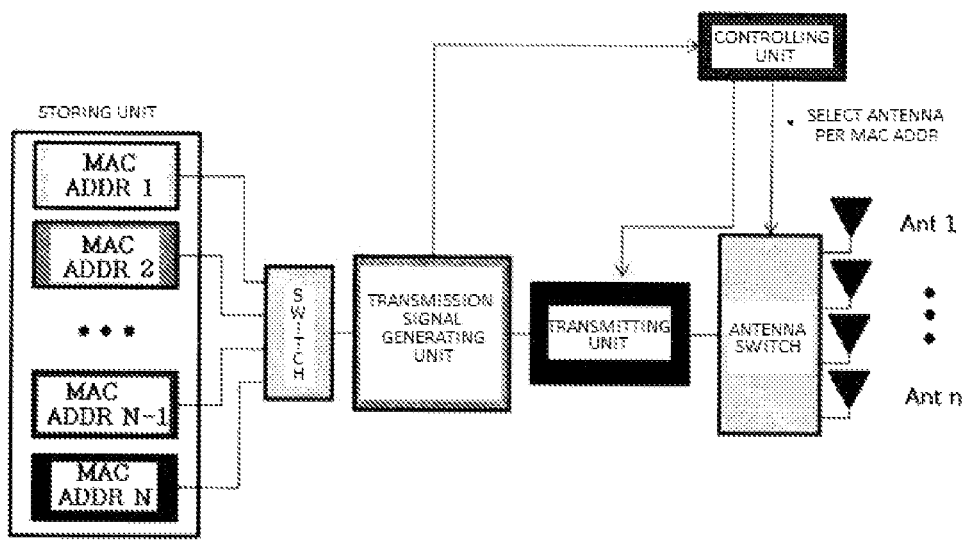
FIG. 11 is a conceptual diagram of a multi-antenna access point.

FIG. 9 is a conceptual diagram of a single antenna access point; FIGS. 10A and 10B are diagrams showing a form in which a plurality of antennas are installed in on body part; and FIG. 11 is a conceptual diagram of a multi-antenna access point. FIG. 10A is a perspective view showing a state in which a plurality of antennas are installed in one body; and FIG. 10B is a perspective cross-sectional view showing a state in which a plurality of antennas are installed in one body.

As shown in FIG. 9, one antenna is connected to one communication chip in principle. In FIG. 9, different MAC addresses are allocated to the respective communication chips.

However, it is preferable that in the case in which different position information needs to be transmitted in two or more directions in one access point 100, two or more antennas are installed in one access point 100, as shown in FIG. 4.

Here, a plurality of directional antennas may be installed in one body part as shown in FIGS. 10A and 10B, and a circuit as shown in FIG. 11 may be installed in the body part. In FIGS. 10A and 10B, since one body part is installed on an intersection point among four passages and four directional antennas installed in the body part transmit wireless signals toward the passages, respectively, even though the user terminal enters the intersection point or exits from the intersection point through any passage, it may receive the wireless signal.

FIG. 11 shows an example of a circuit generating different address codes through a plurality of antennas installed in on access point.

In the circuit of FIG. 11, a plurality of MAC addresses are stored in a storing unit, and one of the plurality of MAC addresses is transmitted to a transmission signal generating unit by selection of a switch. The transmission signal generating unit generates a transmission signal including the MAC address, transmits the transmission signal to a transmitting unit, and informs a controlling unit that the transmission signal has been transmitted to the transmitting unit. The controlling unit controls the transmitting unit and an antenna switch to allow the transmission signal to be transmitted through a corresponding antenna. As a result, each antenna transmits different address (MAC address) codes.

The circuit of FIG. 11 is only an example, and a circuit generating different address codes through the plurality of antennas installed in one access point may be implemented by various other methods.

Although the case in which transmission areas of the respective antennas are not overlapped with has been shown in FIGS. 10A and 10B, even though directional antennas are used, there may be a position at which transmission areas of the respective antennas are overlapped with each other, such that signals may be received from two or more antennas.

Therefore, it is preferable to use a time division scheme or a frequency division scheme when transmitting the signals from the plurality of antennas.

When the signals are transmitted using the time division scheme, the respective antennas transmit the signals at different times through the same channel. Therefore, even though the user terminal 200 is positioned at a position at which it may receive signals from two or more antennas, it may accurately receive the signals transmitted from the respective antennas.

When the signals are transmitted using the frequency division scheme, the respective antennas transmit the signals using different frequencies. Therefore, even though the user terminal 200 is positioned at a position at which it may receive signals from two or more antennas, it may accurately receive the signals transmitted from the respective antennas.

Since the frequency division scheme may simultaneously transmit the signals from two or more antennas, it has an advantage that it may transmit the signals at a time shorter and more frequently as compared with the time division scheme, but has a disadvantage that it occupies a frequency band larger as compared with the time division scheme.

If necessary, the time division scheme and the frequency division scheme may be simultaneously used.

Figure 12:
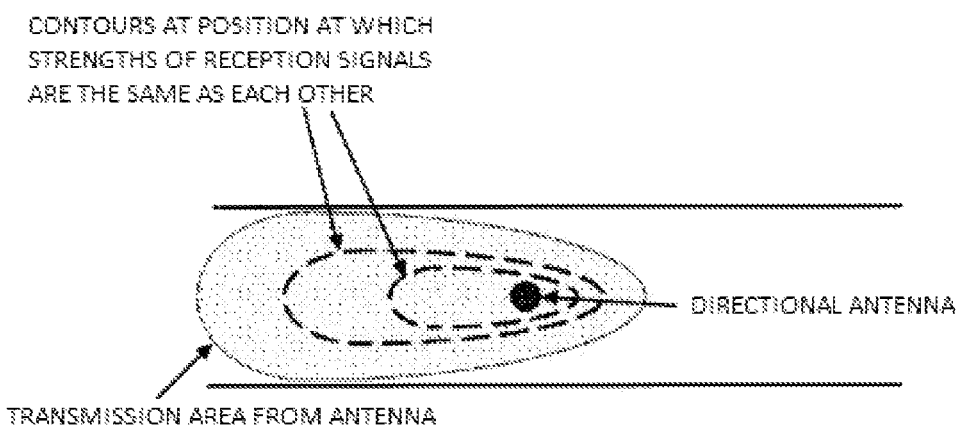
FIG. 12 is a diagram showing a transmission area by one directional antenna.
Figure 13:
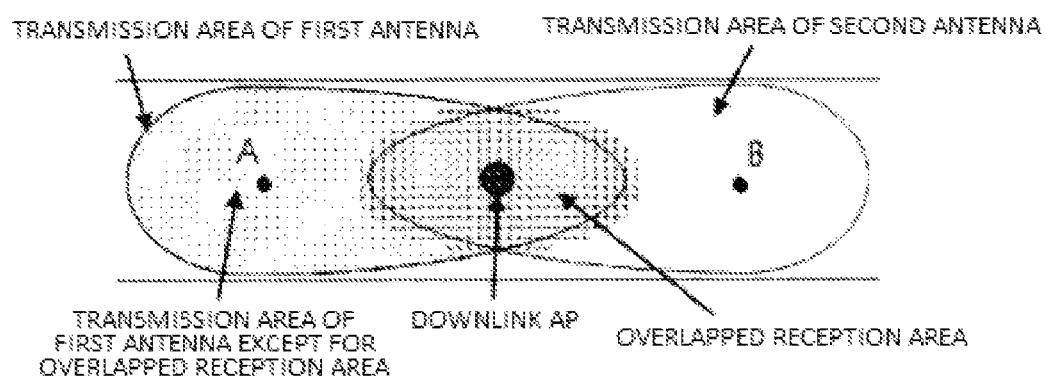
FIG. 13 is a diagram showing a transmission area by two directional antennas.
Figure 14:
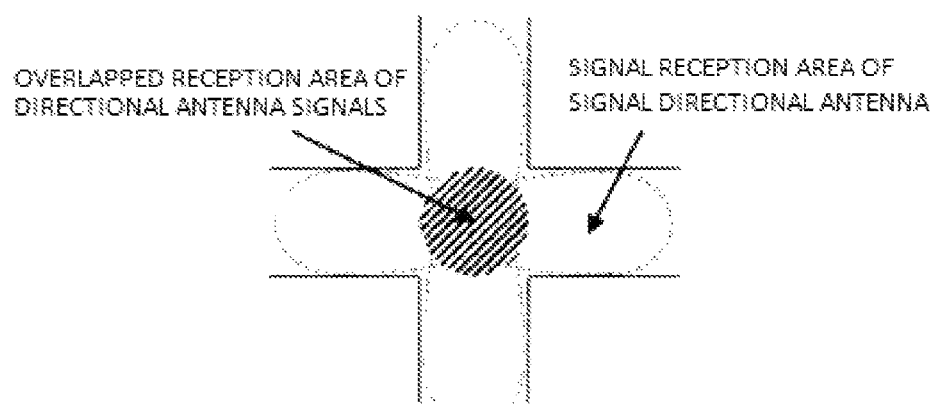
FIG. 14 is a diagram showing a transmission area by four directional antennas.

FIG. 12 is a diagram showing a transmission area by one directional antenna; FIG. 13 is a diagram showing a transmission area by two directional antennas; and FIG. 14 is a diagram showing a transmission area by four directional antennas.

An electric wave transmission area by one directional antenna is more accurately shown in FIG. 12 than in FIGS. 10A and 10B. The closer to the center the plurality of contours of FIG. 12 are, the stronger the strength of a signal.

When two directional antennas are installed in one downlink access point, electric wave transmission areas are shown as in FIG. 13. It may be estimated that the user terminal is in the vicinity of a point A when a signal by a first antenna is received by the user terminal and a signal by a second antenna is not received by the user terminal, it may be estimated that the user terminal is in the vicinity of a point B when the signal by the second antenna is received by the user terminal and the signal by the first antenna is not received by the user terminal, and it may be estimated that the user terminal is in the vicinity of a position immediately below the downlink access point (downlink AP) when both of the signal by the first antenna and the signal by the second antenna are received by the user terminal. Describing this in more detail, when a strength of the signal by the second antenna is larger than that of the signal by the first antenna by a threshold or more, it may be estimated that the user terminal is in the vicinity of the point B. To the contrary, when the strength of the signal by the first antenna is larger than that of the signal by the second antenna by a threshold or more, it may be estimated that the user terminal is in the vicinity of the point A. Meanwhile, when the strengths of the signal by the first antenna and the signal by the second antenna are similar to each other and are a predetermined threshold or more, it may be estimated that the user terminal is positioned immediately below the downlink access point (downlink AP).

Here, when a change in RSSI signal values or PDR information is used, it is possible to more accurately estimate the position.

When four directional antennas are installed in one downlink access point at an intersection connected to fourth passages, an electric wave reception area is shown as in FIG. 14, and the user terminal may estimate its position from received signals.

When the signals may be received from the plurality of antennas as shown in FIGS. 13 and 14, the time division scheme or the frequency division scheme may be used in order to prevent interference between the respective signals.

The present invention is not limited to the above-mentioned exemplary embodiments, and may be variously applied, and may be variously modified without departing from the gist of the present invention claimed in the claims.

INDUSTRIAL APPLICABILITY

The device for estimating a position may be used to guide a pedestrian path. That is, when map information and position information are provided to the user terminal 200, the device for estimating a position may be used to guide neighboring geography, a path, and the like. A separate server may also be installed in the user terminal 200 in order to provide the map information.

The invention claimed is:

1. A device for estimating a position using a downlink access point, comprising:
    a plurality of downlink access points installed at specific positions; and
    one or more user terminals displaying its current position,
    wherein the plurality of downlink access points wirelessly transmits different information, the user terminal estimates its current position from the different information received from the plurality of downlink access points, and one or more of the plurality of downlink access points includes two or more directional antennas, and the respective directional antennas transmit the different information,
    wherein the two or more directional antennas of the downlink access point are installed at an intersection point having two or more entrance and exit paths, and the respective directional antennas are installed in directions directed toward areas corresponding to the respective entrance and exit paths and transmit information corresponding to the respective entrance and exit paths.

2. The device for estimating a position using a downlink access point of claim 1, wherein signals transmitted from the two or more antennas are transmitted in a time division scheme.

3. The device for estimating a position using a downlink access point of claim 1, wherein signals transmitted from the two or more antennas are transmitted in a frequency division scheme.

4. A downlink access point comprising:
    two or more directional antennas installed in different directions,
    wherein the antennas transmit different information,
    wherein the two or more directional antennas of the downlink access point are installed at an intersection point having two or more entrance and exit paths, and the directional antennas are installed in directions directed toward areas corresponding to the respective entrance and exit paths and transmit information corresponding to the respective entrance and exit paths.

5. The downlink access point of claim 4, wherein signals transmitted from the two or more antennas are transmitted in a time division scheme.

6. The downlink access point of claim 4, wherein signals transmitted from the two or more antennas are transmitted in a frequency division scheme.

7. A method of using a device for estimating a position including a downlink access point including an antenna and one or more user terminals displaying its current position, comprising:
    a position estimating step of estimating a user terminal's current position from information received by the user terminal in response to a strength of a signal from the downlink access point received by the user terminal being a predetermined reference value or more; and
    an inertial navigation position estimating step of estimating a user terminal's current position by reflecting the position estimated in the position estimating step and a measurement result of an inertial sensing unit in response to the strength of the signal received by the user terminal being less than the predetermined reference value,
    wherein in response to an area in which data are simultaneously received from two or more antennas installed in the downlink access point is present, in the position estimating step, it is estimated whether a simultaneous data receivable area or a single data receivable area is present based on whether or not the data are received from the two or more antennas, and a position of the user terminal is more accurately estimated using magnitudes of the signal or signals from the downlink access point received by the user terminal.

8. The method for estimating a position of claim 7, wherein in response to data being simultaneously received from two or more antennas installed in one access point in the position estimating step, a moving direction of the user terminal is estimated using a change in data reception signals received from the two or more antennas.

9. A method of using a device for estimating a position, comprising:
  a data receiving step of receiving transmission data wirelessly provided from a downlink access point, by a user terminal;
  a first signal quality measuring step of measuring signal quality of the transmission data received in the data receiving step, by the user terminal;
  a first position estimating step of receiving coordinate information of the transmission data received in the data receiving step and estimating the position, by the user terminal, in response to a strength of the signal measured in the first signal quality measuring step being a predetermined reference value or more;
  a second signal quality measuring step of measuring signal quality of the downlink access point transmitting the transmission data wherein the user terminal estimates the position using the transmission data;
  an inertial navigation position estimating step of receiving the position estimated in the position estimating step and inertial sensed data of the user terminal and estimating the position using inertial navigation, by the user terminal, in response to a strength of the signal measured in the second signal quality measuring step being less than a predetermined reference value;
  a third signal quality measuring step of receiving the transmission data of the downlink access point or another downlink access point and measuring signal quality, by the user terminal;
  a first position correcting step of receiving the position estimated in the first position estimating step or the inertial navigation position estimating step, receiving the transmission data in the third signal quality measuring step, and correcting the position estimated in the first position estimating step or the inertial navigation position estimating step with the third signal quality measuring step to estimate the position, by the user terminal, in response to a strength of the signal measured in the third signal quality measuring step being a predetermined reference value or more; and
  a program ending step of ending a program of estimating the position of the user terminal.

10. A method of using a device for estimating a position, comprising:
  a data receiving step of receiving transmission data wirelessly provided from a downlink access point, by a user terminal;
  a first signal quality measuring step of measuring signal quality of the transmission data received in the data receiving step, by the user terminal,
  wherein the transmission data wirelessly provided from the downlink access point includes at least one position information selected among coordinate information including X and Y coordinates of a point at which the downlink access point is installed, the transmission data further including at least one selected among a Z coordinate, layer information, and an access point ID value, at least one or more characteristic information indicating a geographical characteristic of the point at which the downlink access point is installed and selected among an entrance and exit, a passage, an N-direction junction (N indicates a natural number of 2 or more), a lobby, stairs, and an elevator lobby, and at least one or more sector information selected among azimuth information of an electric wave projection direction, an electric wave radiation angle, and an electric wave radiation strength of the downlink access point at the point at which the downlink access point is installed; and
  a program ending step of ending a program of estimating the position of the user terminal.

11. The method for estimating a position of claim 9, wherein the first position correcting step includes:
  a trajectory correcting step of receiving characteristic information and sector information of the transmission data received in the third signal quality measuring step and correcting a moving trajectory, by the user terminal.

12. The method for estimating a position of claim 11, the first position correcting step further comprising:
  a position correcting step of receiving the coordinate information of the transmission data received in the third signal quality measuring step and correcting the position by the user terminal.

* * * * *